Nov. 7, 1961  J. N. J. LEEMAN  3,007,573
APPARATUS FOR SEPARATING PARTICLES ACCORDING TO SPECIFIC GRAVITY
Filed Jan. 22, 1959  2 Sheets-Sheet 2

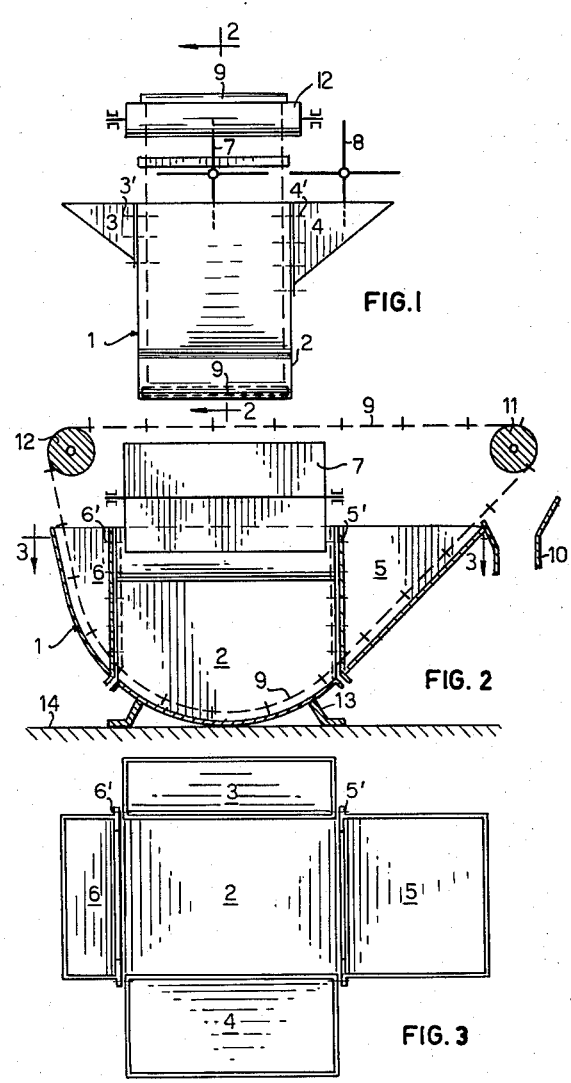

JAN N. J. LEEMAN

BY: Cushman, Darby & Cushman
ATTORNEYS

United States Patent Office 3,007,573
Patented Nov. 7, 1961

3,007,573
APPARATUS FOR SEPARATING PARTICLES ACCORDING TO SPECIFIC GRAVITY
Jan N. J. Leeman, Brunssum, Netherlands, assignor to Stamicarbon N.V., Heerlen, Netherlands
Filed Jan. 22, 1959, Ser. No. 788,287
Claims priority, application Netherlands Jan. 24, 1958
4 Claims. (Cl. 209—172.5)

This invention relates to an apparatus for separating solid particles according to specific gravity. More particularly the invention relates to a specific gravity separator, which consists of a tank and of conveying means for discharging the separated particles.

Apparatus of this kind is used for separating raw coal into washed coal and shale. The separatory tank is to this end filled with a medium of such a specific gravity that the coal floats and the shale sinks. The fractions separated in this way are removed from the separatory tank by means of transport means, such as a scraper conveyor.

Apparatus of this kind may further be used in the classification of particles by means of a flowing liquid. The settling rate of the coarse particles in a liquid is higher than the settling rate of the fine particles. As a result, the coarse particles settle to the bottom of the tank from where they may be removed by means of a conveyor, whereas the fine particles are washed across an overflow weir.

In known apparatus the conveyors are mounted with their drives on the separatory tank. This necessitates an accurate adjustment of the shafts of scraper conveyors etc., so as to ensure that the conveyor will be correctly guided in the tank. In addition, the construction of the separatory tank will have to be reinforced, in order to be capable of bearing the weight of the conveyors with their drives and of absorbing the reactional forces exerted by the conveying mechanism.

Furthermore, difficulties are encountered when the separatory tank is transported to and installed at its destination in the washery, and in adapting the tank to the situation, such as the direction of flow of the products, in the washery.

It is therefore an object of the present invention to provide an apparatus for separating solid particles in which a light and easily transportable separatory tank may be used.

Another object of the invention is to provide an apparatus for separating solid particles in which the separatory tank is not loaded by the reactional forces exerted by the conveyor elements and their drives.

Still another object of the invention is to provide an apparatus for separating solid particles in which the conveying elements can be easily adjusted with respect to the tank.

A further object of the invention is to provide an apparatus for separating solid particles in which the separatory tank consists of detachable parts.

A still further object of the invention is to provide an apparatus for separating solid particles in which the separatory tank may be easily adapted to the direction of flow of the products in the washery.

With these and other objects in view the invention will hereinafter be described with reference to the accompanying drawings in which:

FIGURE 1 is a diagrammatic side elevation view of a separatory tank according to the invention;

FIGURE 2 is an elevation section view of the apparatus taken substantially along line 2—2 of FIGURE 1;

FIGURE 3 is a plan view of the tank, taken substantially along line 3—3 of FIGURE 2, in which the conveying means are omitted;

Figure 4:
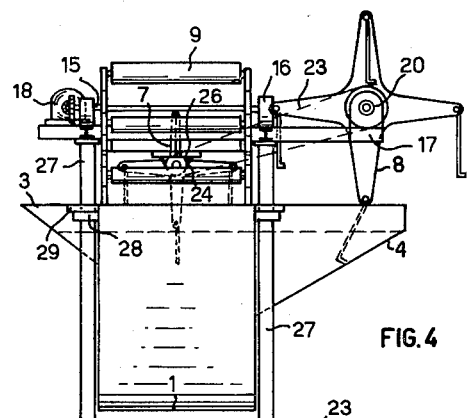
FIGURE 4 is a side elevation view of a modified construction.

Referring to the drawings, in which like parts are indicated by like reference numerals, raw coal is separated in a tank 1 into coal and shale, by means of a liquid whose specific gravity is intermediate between that of the coal and that of the shale.

The tank 1 consists of a central section defining a separatory compartment 2 where sink and float separation takes place, a feed chute 3 providing a mixture receiving inlet through which the particles to be separated are fed to the separatory compartment, a discharge chute 4 providing a discharge outlet for the float or light fraction, a discharge chute 5 providing a discharge outlet for the sink or heavy fraction, and an end section 6.

The coal floating on the separatory liquid is propelled to the discharge chute 4 by suitable conveying means, such as blade wheels 7 and 8, and the shale, which has settled in the separatory compartment 2, is conveyed by a scraper conveyor 9 through the discharge chute 5 and thus to the shale discharge 10. The scraper conveyor is returned to the end section 6 over reverse wheels 11 and 12. The flight of the conveyor passing through the end section 6, separatory compartment 2, and discharge chute 5 is maintained in proper position along the bottoms thereof by suitable guide means if necessary.

In the embodiment shown in FIGURE 2, the separatory compartment is provided with feet 13 which rest on the floor 14 of the washery building. The feed chute 3, the discharge chutes 4 and 5 and the end section 6 are manufactured as separate units and fixed by means of bolts 3', 4', 5' and 6' or the like to the central section or separatory compartment 2 when this has been installed in the washery. This facilitates the transport of the separatory tank to its destination in the washery, and the installation of the tank, as instead of the complete separatory tank only comparatively small parts need be transported.

As shown in FIGURE 2 the separatory compartment 2 is symmetrical in the vertical plane according to this figure, so that the two opposed parts 5 and 6 can be made to exchange places, and the separatory tank can be adapted to the flow of products in the washing plant in fixing these parts in a suitable manner to the separatory compartment 2. If, for instance, it should be desirable for the sink or heavy fraction to be discharged to the left of the feed, the discharge chute 5 is mounted in the way as shown in the drawings, and if, in view of the situation in the washing plant, it should be desirable for this fraction to be discharged to the right of the feed, the discharge chute 5 is mounted on the opposite side. Also in the case that the product flow has been changed because of alterations in the washing plant, the washing tank may be adapted to these alterations in a simple way by making the feed and discharge chutes concerned exchange places.

Figure 5:
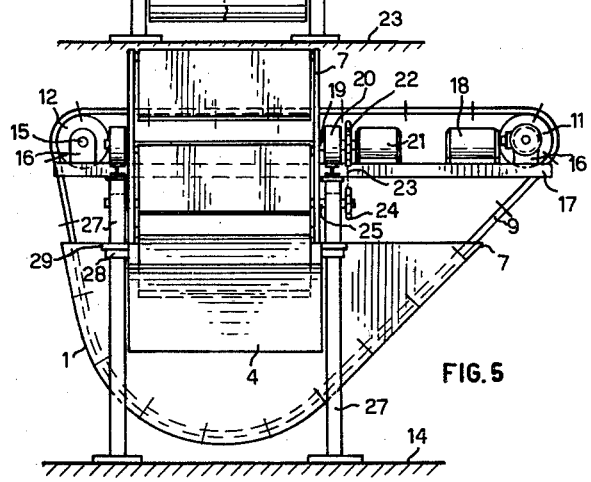
FIGURE 5 is a front elevation view of this construction.

Referring now to FIGURES 4 and 5, the shafts 15 of the return wheels 11 and 12 are supported in bearings 16, which may be made displaceable, with a view to the tightening of the conveyor 9, and which are supported on a platform structure 17, on which also the driving motor 18 of the conveyor is mounted.

The shaft 19 of the blade wheel 8 is supported in bearings 20, which, together with the driving motor 21, are likewise mounted on platform structure 17. On shaft 19 a chain wheel 22 is mounted, which, via a chain 23, drives a chain wheel 24 on the shaft 25 of blade wheel 7. The shaft 25 is supported in bearings 26, which are fixed to the underside of platform structure 17.

Platform structure 17 is supported by four column members 27 which rest on the floor 14 and define with the platform structure the frame of the apparatus. The columns 27 are provided with brackets 28, from which the separatory tank is suspended by lugs 29. The separatory tank can be shifted on the brackets until the scraper conveyor 9 takes up the desired position in the tank, after which the tank is fixed in this position by means not shown in the drawings. This way of adjusting the conveyor with respect to the tank is much simpler than adjusting the shafts of the conveyor separately. It will also be noted that the position of bearings 16 relative to the platform structure 17 should be suitably varied to accommodate the particular adjusted locations of the end section and chutes relative to the central section of the tank.

The reaction forces of the conveyors and their drives are now directly transmitted to the foundation of the washing plant as shown in FIGURE 2, the separatory tank may also directly be supported by the floor of the washery.

The terminology used in the specification is for the purpose of description and not of limitation, the scope of the invention being defined in the claims.

I claim:

1. An apparatus for separating a mixture of solid particles of different specific gravities and/or grain sizes comprising, frame means, a separatory tank for receiving a suspension of a specific gravity sufficient to cause one fraction of the mixture of particles to be separated to float therein and one fraction to sink therein, said separatory tank including a central section defining a separatory compartment, a feed chute section detachably connected with said central section in communication therewith, a float fraction discharge chute section detachably connected with said central section in communication therewith in a position opposite said feed chute section, a sink fraction discharge chute section detachably connected with said central section in communication therewith in a position normal to said feed chute section and said float discharge chute section, and an end section detachably connected with said central section in communication therewith in a position opposite said sink discharge chute section, at least one pair of opposed sections being shaped for interchangeable connection with said central section, means for supporting said tank from said frame means, first conveyor means supported on said frame means independent of said separatory tank for moving the float fraction from the upper portion of said separatory compartment to said float fraction discharge outlet, and second conveyor means supported on said frame means independent of said separatory tank for moving the sink fraction from the lower portion of said separatory tank to said sink fraction discharge outlet.

2. Apparatus as defined in claim 1 wherein said frame means includes a platform structure having a plurality of spaced column members fixedly connected to said platform structure for supporting the latter in an elevated position, and including means supported by said platform structure independent of said separatory tank for driving said conveyor means.

3. Apparatus as defined in claim 2 wherein said tank supporting means comprises brackets fixed to said column members.

4. Apparatus as defined in claim 3 wherein said central section is symmetrical with respect to a vertical plane through said feed chute section and said float discharge chute section.

References Cited in the file of this patent

UNITED STATES PATENTS

| 2,138,825 | Allen | Dec. 6, 1938 |
| 2,489,661 | Munro | Nov. 29, 1949 |

FOREIGN PATENTS

| 33,861 | Netherlands | Oct. 15, 1934 |